United States Patent [19]

Masuda et al.

[11] 4,353,213

[45] Oct. 12, 1982

[54] SIDE STREAM TYPE CONDENSING SYSTEM AND METHOD OF OPERATING THE SAME

[75] Inventors: Toyohiko Masuda; Takeshi Ueno; Yoji Nagai; Hiroshi Tsunematsu; Shozo Nakamura, all of Hitachi, Japan

[73] Assignee: Hitachi, Ltd., Tokyo, Japan

[21] Appl. No.: 177,072

[22] Filed: Aug. 11, 1980

[30] Foreign Application Priority Data

Aug. 21, 1979 [JP] Japan .................................. 54-105513

[51] Int. Cl.$^3$ ............................................. F01K 19/00
[52] U.S. Cl. ...................................... 60/646; 60/657; 60/692; 60/667
[58] Field of Search ................. 60/646, 657, 667, 690, 60/692

[56] References Cited

U.S. PATENT DOCUMENTS 4,055,048 10/1977 Reed ..................................... 60/646

Primary Examiner—Allen M. Ostrager
Attorney, Agent, or Firm—Antonelli, Terry & Wands

[57] ABSTRACT

A side stream type condenser which has a first hot well for condensing steam exhausted from a turbine and storing the condensed water and a second hot well for storing the purified condensed water to prepare for water feed to a main system includes a partition plate for defining the two hot wells. The partition plate is formed with a weir portion so that part of the condensed water in the second hot well may overflow to keep a fixed water level. The weir portion is constructed in the shape of a labyrinth and is formed with a passage normally filled up with the condensed water, and a space in the upper part of the second hot well communicates with the upper space of the first hot well through this passage only. The condensed water in the first hot well is fed to a purifying system disposed outside, and is purified therein. It is thereafter fed to the second hot well when the main system requires the feed water and to the first hot well when not, through pipe means constructed so as to feed the water selectively to the first hot well and the second hot well. The water level of the first hot well is controlled by causing the condensed water to overflow from the weir portion. On the other hand, the water level of the second hot well is controlled in such a way that the actual water level is detected by a water level gauge disposed in the second hot well, that the quantities of water in an inlet and outlet of a tank for storing the feed water of the main system are controlled in accordance with the detected water level, and that the feed water of the tank is caused to flow into the first hot well.

11 Claims, 3 Drawing Figures

SIDE STREAM TYPE CONDENSING SYSTEM AND METHOD OF OPERATING THE SAME

BACKGROUND OF THE INVENTION

This invention relates to a side stream type condensing system in a power plant, and a method of operating the same.

In general, the hot well portion of a side stream type condenser in the side stream type condensing system of a steam turbine in the power plant is divided into the two independent wells of a first hot well and a second hot well. The first hot well stores therein condensed water which is the condensate of exhaust steam from the steam turbine. The condensed water is continuously fed from the first hot well to a water treatment equipment disposed in the exterior, and is treated here. This has been described in, for example, U.S. Pat. No. 4,055,043. It has also been known that the condensed water treated is fed to a heat exchange system which includes a gland steam condenser, a condenser air extractor, etc. The condensed water has its temperature raised by heat exchange here. The greater part of the condensed water is fed to the second hot well, and the remaining part is returned to the first hot well. The condensed water in the second hot well is fed to a main system in accordance with the operating state of the power plant.

As the features of the side stream type condenser wherein the condensed water purifying system is made independent of the main system as described above, there are mentioned that the condensed water purifying system can have the flow rate controlled independently of the water supply system of the main system, that since the pressure and the flow rate do not fluctuate abruptly, the performance of purifying the condensed water is enhanced, etc. Since, however, water levels need to be controlled in two places, how the water level controls during the normal operation and during the shutdown are made is a problem.

An an example of the water level controls of the hot wells of the side stream type condenser, the following method has been known.

The water level control of the first hot well is carried out in such a way that the flow rates of the condensed water from the condensed water purifying system to the first and second hot wells are regulated in accordance with the water level of the first hot well. The water level control of the second hot well is carried out in such a way that a condensed water storing tank which is connected to the main system and the first hot well is disposed, and that the quantity of return of the condensed water from the second hot well to the condensed water storing tank and the quantity of supplementary water from the condensed water storing tank to the first hot well are regulated in accordance with the water level.

In this water level control method, however, the water level control of the first hot well imparts fluctuations as disturbances to the flow rate of the condensed water flowing through the condensed water purifying system and the water level of the second hot well. In addition, notwithstanding the water level of the first hot well is directly relevant to the quantity of the supplementary water from the condensed water storing tank, the flow rate is controlled in accordance with the water level of the second hot well, so that the response of the water level control becomes slow. Moreover, the result of the water level control of the second hot well affects the water level control of the first hot well as a disturbance, which leads to the inconvenience that the two water level controls interfere with each other.

A further disadvantage is that when the side stream type condensing system is operated alone during the shutdown of the power plant, the water level controls of the hot wells become impossible.

SUMMARY OF THE INVENTION

An object of this invention is to provide a side stream type condensing system which permits a water level control of excellent responsiveness and stability, and a method of operating it.

Another object of this invention is to provide a side stream type condensing system which permits a control of excellent responsiveness and stability and which exhibits a high thermal efficiency, and a method of operating it.

Still another object of this invention is to provide a side stream type condensing system which permits a control of excellent responsiveness and stability and which conspicuously limits the self-vaporization of condensed water to raise the thermal efficiency, and a method of operating it.

To sum up, this invention consists in a side stream type condensing system wherein the condensate of turbine exhaust steam stored in a first hot well of a side stream type condenser having first and second hot wells is purified by a condensed water purifying system and wherein the purified condensed water is fed to a main system of a power plant through the second hot well, characterized in that the condensed water purified by the condensed water purifying system is supplied to the second hot well to prepare for the water feed to the main system, and that surplus water is caused to overflow from the second hot well and to return into the first hot well.

Owing to this construction, only the water level of the first hot well needs to be controlled, and a water level control which is stable and quick in response becomes possible.

By way of example, a weir portion over which the condensed water of the second hot well is caused to spill is formed with a water passage which is normally filled with the condensed water, and an upper space of the second hot well is held in communication with an upper space of the first hot well through the passage. Thus, the vaporization of the condensed water in the space of the second hot well is limited, and heat radiation due to the vaporization is reduced. Therefore, the thermal efficiency of the whole power plant is improved.

DESCRIPTION OF THE PREFERRED EMBODIMENTS

Figure 1:
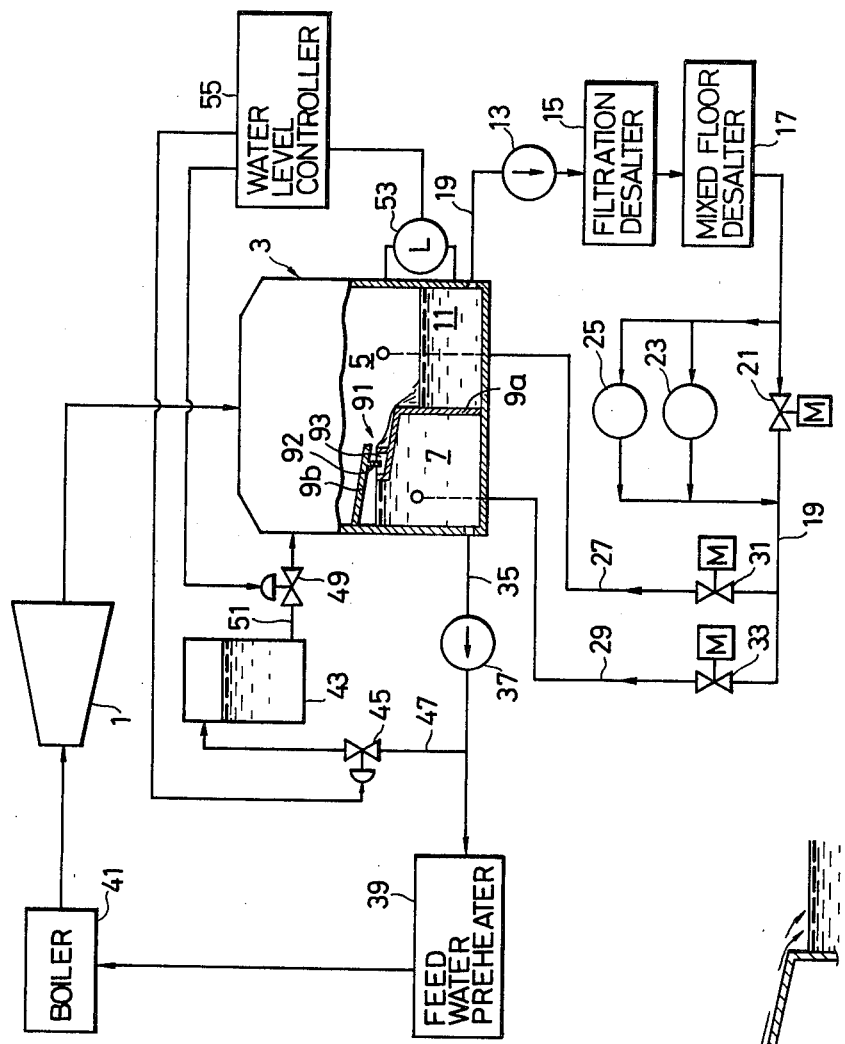
FIG. 1 is a conceptual view of a power plant which includes an embodiment of a side stream type condensing system according to this invention.
Figure 2:
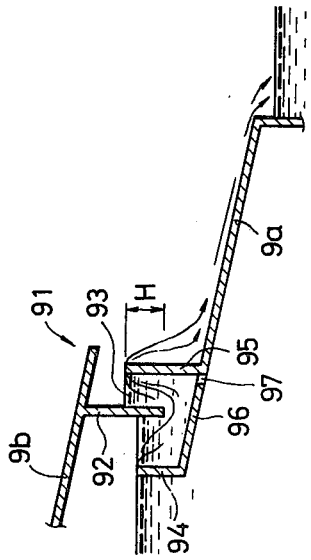
FIG. 2 is a sectiona view showing on enlarged scale a part of a side stream type condenser in FIG. 1.

Referring to FIGS. 1 and 2, an embodiment of a side stream type condensing system according to this invention will be described in detail hereunder.

In FIG. 1, steam exhausted from a steam turbine 1 of a power plant is fed to a side stream type condenser 3 and is cooled and condensed here into condensed water. The side stream type condenser 3 has the interior divided into two compartments 5 and 7 by partition plates 9a and 9b. The first compartment 5 includes a condensing portion which lies in an upper space thereof and which condenses the steam into the condensed water, and a hot well 11 which underlies the condensing portion. The second comartment 7 is a second hot well which is independent of the first hot well 11 and which is closed by the partition plate 9a mainly defining the lateral extent thereof and the partition plate 9b defining the top part thereof. As will be described in detail later, a weir portion 91 is formed on the partition plate 9a, and it forms a water passage 93 together with a vertical plate 92 of the upper partition plate 9b. The condensed water in the second hot well overflows through this water passage, and flows into the first hot well 11. A condensed water purifying system which includes a pump 13, a filtration type desalter 15 and a mixed floor type desalter 17 is connected to the first hot well 11 by a pipe 19. Connected to the pipe 19 on the lower stream side of the condensed water purifying system is a heat exchange system in which a motor-driven valve 21, a condenser air extractor 23 and a gland steam condenser 25 are connected in parallel. The condenser air extractor 23 functions to condense steam for driving a steam ejector as is used for extracting non-condensable gases within the condenser. The gland steam condenser 25 functions to condense sealed steam in a gland portion of a turbine valve. The pipe 19 on the lower stream side of the heat exchange system is branched into two pipes, a condensed water return pipe 27 and a condensed water supply pipe 29. The condensed water return pipe 27 is provided with a motor-driven valve 31, and is connected to above the first hot well 11. The condensed water supply pipe 29 is provided with a motor-driven valve 33, and is connected to the second hot well 7.

A lower part of the second hot well 7 is connected by a water feed pipe to a main system 35 which includes a condensate pump 37, various feed water preheaters 39, a boiler 41, etc. On the lower stream side of the condensate pump 37, the water feed pipe is connected with an upper part of a condensed water storing tank 43 through a pipe 47 which has a spill-over valve 45. A lower part of the storing tank 43 is connected with an upper part of the first compartment 5 by a pipe 51 which has a supplementary water regulating valve 49, whereby the condensed water of the storing tank 43 enters the first hot well 11. A water level detector 53 for detecting the water level of the first hot well 11 is disposed in a lower part of the condenser 3. Wiring is made so that a water level detection signal of the water level detector 53 may be transmitted to a water level controller 55. The water level controller 55 is connected to the spill-over valve 45 and the supplementary water regulating valve 49 so as to transmit the signal of the water level detector 53 and a signal corresponding to a water level set value thereto.

The water level of the second hot well 7 is determined by the height of the upper end of the weir portion 91. The structure of the weir portion 91 will be described more in detail with reference to FIG. 2.

In FIG. 2, an upper slant end part of the partition plate 9a is provided with a pair of ridges 94 and 95 spaced from each other. The ridges 94 and 95 are constructed so as to extend vertically and horizontally and to form a substantially U-shaped section together with a bottom portion 96. The vertical plate 92 which extends downwards from the vicinity of a slant end part of the upper partition plate 9b is interposed between the pair of ridges 94 and 95 so as to form a labyrinth structure, in which the water passage 93 having a staggered section is formed. The length H of the parts of the lower stream side ridge 95 and the vertical plate 92 overlapping in the direction of height, that is, the seal height H is determined by the difference of pressures in the first hot well 11 and the second hot well 7, and is made somewhat greater than the value of the pressure difference represented as a water head. A lower stream side end part of the U-shaped bottom 96 constituting the weir portion 91 is provided with a water vent 97 which serves to prevent the condensed water from remaining there when the condensed water of the second hot well 7 has been reduced.

In the side stream type condensing system of the above construction, the condensed water of the exhaust steam of the steam turbine is stored in the first hot well 11, and it is purified by the condensed water purifying system which includes the pump 13, the filtration type desalter 15 and the mixed floor type desalter 17. The treated water is subsequently subjected to the heat exchange and has its temperature raised by means of the heat exchange system which includes the motor-driven valve 21, the gland steam condenser 25 and the condenser air extractor 23. During the steady operation, the condensed water purified and with the temperature raised has the full flow rate of the side stream system supplied into the second hot well 7 through the pipe 19 as well as the condensed water supply pipe 29 having the motor-driven valve 33, to prepare for the water feed to the main system 35. At this time, the surplus water of the condensed water in the second hot well 7 overflows from the water passage 93 of the weir portion formed in the upper part of the second hot well 7, and it is returned into the first hot well 11 through the steam space of the first hot well 11.

As stated above, the condensed water supplied to the second hot well 7 has undergone the temperature rise owing to the heat exchange in the heat exchange system. As a result, the temperature and saturation pressure of the condensed water in the second hot well 7 are higher than those in the first hot well 11. For this reason, in case where the upper space of the second hot well 7 is in direct communication with the upper space of the first hot well 11, the condensed water in the second hot well vaporizes much. In this invention, however, the upper part of the second hot well 7 is closed, and it communicates with the upper space of the first hot well 11 through only the water passage 93 formed by the labyrinth structure. Accordingly, the self-vaporization in the second hot well 7 is prevented, and the thermal efficiency is enhanced.

The water level control of the first hot well 11 is carried out as follows. The water level detection signal of the water level detector 53 of the first hot well 11 is applied to the water level controller 55, the degree of opening of the spill-over valve 45 and the degree of opening of the supplementary water regulating valve 49 are controlled by the water level controller 55, and the quantity of return of the condensed water from the condensed water purifying system to the condensed water storing tank 43 and the quantity of supplementary water from the supplementary water tank 43 to the first hot well 11 are regulated, whereby the water level of the first hot well is adjusted. More specifically, in case where the water level of the first hot well 11 has risen, the opening of the spill-over valve 45 is widened to increase the quantity of return of the condensed water to the condensed water storing tank 43, and therewith, the opening of the supplementary water regulating valve 49 is fined to decrease the quantity of the supplementary water to the first hot well 2. Conversely, in case where the water level of the first hot well 11 has lowered, the opening of the spill-over valve 45 is fined to decrease the quantity of return of the condensed water to the condensed water storing tank 43, and the opening of the supplementary water regulating valve 49 is widened to decrease the quantity of the supplementary water to the first hot well 11.

Regarding the water level of the second hot well 7, the openings of the motor-driven valves 31 and 33 are set so that the condensed water may be normally caused to fill up to the water passage 93 in the upper part of the second hot well 7 and that part of the condensed water may be returned to the first hot well 11 through the water passage 93 even during the water feed to the main system 35. That is, in case where the quantity of water feed to the main system 35 has changed, merely the quantity of the condensed water to return to the first hot well 11 through the water passage 93 changes, and the water level control of the second hot well 7 is unnecessary.

When the motor-driven valves 31 and 33 are regulated so as to normally feed the full flow rate of the side stream system through the condensed water supply pipe 29 from the first hot well 11 to the second hot well 7, the return pipe 27 can be dispensed with.

During the steady operation of the main system, the surplus water of the second hot well 7 is returned from the upper part of the second hot well 7 to the first hot well as stated previously. Before the starting of the main system 35 or during the shutdown thereof, the full flow rate of the side stream system is returned from the upper part of the second hot well 7 or the return pipe 27 to the first hot well 11, whereby the side stream system can be operated independently of the operating state of the main system 35 and also the corrosion of metal within the side stream type condenser 3 can be prevented. Moreover, even during the shutdown of the main system 35, the cooling of the heat exchange system including the gland steam condenser 25 and the condenser air extractor 23 and the quantity and quality of the water of the spill-over can be secured.

Further, during the shutdown of the main system 35, by connecting the pipe 19 immediately downstream of the desalter 17 to the pipe 47, the condensate may be circulated in the course of the first hot well 11, the desalters 15, 17, the spill-over valve 45, and the storage tank 43.

Figure 3:
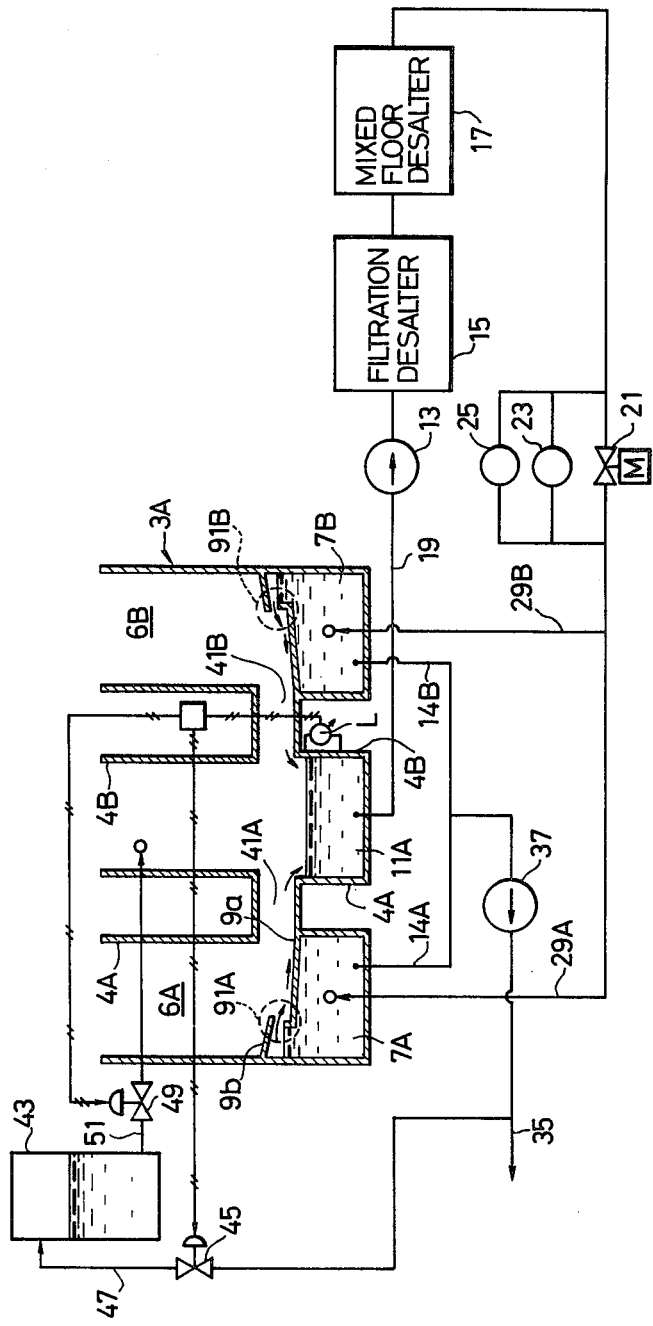
FIG. 3 is a conceptual view showing another embodiment of the side stream type condensing system according to this invention.

FIG. 3 shows another embodiment of this invention. A first hot well 11A is disposed centrally of a hot well portion of a side stream type co condenser 3A, second compartments 6A and 6B separated by partition walls 4A and 4B are formed on both the sides of the first hot well 11, and hot wells 7A and 7B are formed in lower parts of the respecive compartments 6A and 6B. Condensed water which has been purified by a condensed water purifying system and has had its temperature raised by a heat exchange system is supplied into the respective second hot wells 7A and 7B through condensed water supply pipes 29A and 29B connected to a pipe 19. The respective second hot wells 7A and 7B are provided with weir portions 91A and 91B, each of which has the same structure as that of the weir portion 91 shown on enlarged scale in FIG. 2. Surplus water of the second hot wells 7A and 7B overflows from the corresponding weir portions, and is returned to the first hot well 1A through communicating pipes 41A and 41B provided in the respective partition walls 4A and 4B. The condensed water is derived from the respective second hot wells 7A and 7B through condensed water outflow pipes 14A and 14B, and is supplied onto the side of a main system 35 through a condensate pump 37.

The remaining construction and operation of the embodiment of FIG. 3 are the same as in the embodiment shown in FIGS. 1 and 2.

This invention is constructed and operated as thus far described. It comprises as its requirements, at least, that treated water purified by a condensed water purifying system is supplied to a second hot well so as to prepare for water feed to a main system, and that surplus water is returned to a first hot well by overflowing from the upper part of the second hot well. Thus, the water level may be controlled only in the first hot well. Therefore, the water level control becomes simple and the response becomes quick, and no disturbance on the flow rate of a side stream system occurs, so that the performance of the condensed water purifying system can be enhanced.

In addition, according to this invention, a surplus water passage of a labyrinth structure is formed in the upper part of the second hot well, and surplus water of the second hot well is returned from this surplus water passage to the first hot well. Thus, the self-vaporization in the second hot well can be prevented. This brings forth the effect that the thermal efficiency can be raised.

Further, according to this invention, the full flow rate of the side stream system is returned to the first hot well after the purification of the condensed water during the shutdown of the main system. Thus, the corrosion products of metal within a side stream type condenser can be prevented from being produced, and it becomes possible to employ the condensed water for various uses even during the shutdown of the main system.

We claim:
1. A side stream type condensing system comprising:
   first hot well means for condensing exhaust steam from a turbine of a power plant into condensed water and for storing the condensed water therein,
   second hot well means for storing the condensed water therein in order to prepare for water feed to a main system of the power plant,
   weir means disposed in said second hot well means and forming water passage means for causing the condensed water to overflow from said second hot well means to said first hot well means,
   purification means for purifying the condensed water from said first hot well means, and
   pipe means for holding said purification means in communication with said first and second hot well means so as to feed the condensed water from said first hot well means to said second hot well means via said purification means.

2. A side stream type condensing system according to claim 1, wherein said water passage means is filled up with the condensed water from said second hot well means, and said second hot well communicates with said first hot well through this water passage means, whereby an upper space of said second hot well means is closed.

3. A side stream type condensing system according to claim 2, further comprising partition means for separating said first hot well means and said second hot well means, said weir means being disposed in this partition means.

4. A side stream type condensing system according to claim 3, wherein said partition means consists of a pair of partition plates, and a water passage of a labyrinth structure is formed in parts of said partition plates opposing to each other.

5. A side stream type condensing system according to claim 1, wherein said pipe means is branched into two valved pipes downstream of said purification means, and one of said pipes is coupled to said first hot well means, while the other pipe is coupled to said second hot well means.

6. A side stream type condensing system according to claim 1, further comprising control means for controlling a water level of said first hot well, said control means consisting of water level measuring means disposed in said first hot well means, condensed water storing means, first passage means provided with a flow rate regulating valve and for connecting said second hot well and said condensed water storing means, second passage means provided with a flow rate regulating valve and for connecting said condensed water storing means and a space part of said first hot well means, and a water level controller which is connected to said water level measuring means and said flow rate regulating valves of said first and second passage means and which controls said valves on the basis of a signal from said water level measuring means in accordance with a water level.

7. A side stream type condensing system comprising:
a side stream type condenser whose interior is divided into a first hot well for storing therein water condensed in an upper part thereof and a second hot well for storing therein the condensed water in order to prepare for water feed to a main system, by means of one set of upper and lower partition plates in a relationship to adjoin each other in a horizontal direction and which is provided with a passage formed in opposing parts of said set of upper and lower partition plates by a labyrinth structure and for causing the condensed water to overflow from said second hot well to the upper part of said first hot well,
a condensed water purifying system situated downstream of said first hot well and for purifying the condensed water from said first hot well,
a first valved pipe which introduces the condensed water from said first hot well into said second hot well through said condensed water purifying system,
a second valved pipe which branches from said first pipe downstream of said condensed water purifying system and which returns the condensed water to said first hot well, and
means including a storage tank coupled to said second hot well and said first hot well by valved water pipes, and a water level gauge disposed in said first hot well, said means controlling valves of said water pipes in accordance with a fluctuation of a water level of the condensed water in said first hot well, to feed the condensed water from said second hot well to said storage tank and to supplement the condensed water from said storage tank to said first hot well, thereby to control the water level of the condensed water in said first hot well.

8. In a side stream type condensing system having a side stream type condenser including a first hot well, a second hot well and a weir portion disposed in the second hot well, and a condensed water purifying system;
a method of operating a side stream type condensing system comprising the steps of:
condensing steam into condensed water and storing it in said first hot well;
feeding the condensed water from said first hot well to said condensed water purifying system and purifying it in said condensed water purifying system; and
feeding the purified condensed water to said second hot well in a manner to cause part thereof to overflow from said weir portion to said first hot well, to prepare for water feed to a main system.

9. A method of operating a side stream type condensing system according to claim 8, wherein the condensed water at a fixed flow rate is fed to said condensed water purifying system and is purified therein.

10. A method of operating a side stream type condensing system according to claim 9, further comprising the step of returning all of the condensed water from said condensed water purifying system to said first hot well and circulating it through said condensed water purifying system when the water feed from said second hot well to said main system has been stopped.

11. A method of operating a side stream type condensing system according to claim 8, further comprising the steps of:
disposing a condensed water storing tank which is constructed so as to return part of the feed water from said second hot well to said main system thereto and store it therein and to supplement part of the stored condensed water to said first hot well;
detecting a water level of said first hot well; and
regulating a quantity of the return of the condensed water to said condensed water storing tank and a quantity of the supplement of the condensed water from said condensed water storing tank to said first hot well in accordance with the detected water level, to control the water level of said first hot well.

* * * * *